United States Patent [19]
Akama et al.

[11] Patent Number: 6,011,771
[45] Date of Patent: *Jan. 4, 2000

[54] OPTICAL DISC

[75] Inventors: Yusuke Akama; Tomonari Ishikawa, both of Saitama-ken, Japan

[73] Assignee: Pioneer Electronic Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/802,345

[22] Filed: Feb. 11, 1997

[30] Foreign Application Priority Data

Feb. 13, 1996 [JP] Japan .................................. 8-049529

[51] Int. Cl.$^7$ .................................................. G11B 25/04
[52] U.S. Cl. ............................................................. 369/271
[58] Field of Search .............................. 360/99.05, 99.12; 369/270, 271, 280, 281, 282, 290

[56] References Cited

U.S. PATENT DOCUMENTS

| | | | |
|---|---|---|---|
| 4,541,086 | 9/1985 | Tanaka | 369/271 |
| 4,920,437 | 4/1990 | Washo et al. | 360/99.05 |
| 5,001,700 | 3/1991 | Rowden et al. | 369/270 |

FOREIGN PATENT DOCUMENTS

| | | |
|---|---|---|
| 660319A2 | 6/1995 | European Pat. Off. |
| 4243 972A1 | 7/1993 | Germany . |
| 7-296475 | 11/1995 | Japan . |

*Primary Examiner*—William J. Klimowicz
*Attorney, Agent, or Firm*—Nikaido Marmelstein Murray & Oram LLP

[57] ABSTRACT

A compact disc (CD) has a first centering hole having a first radius and has annular projection rings on both sides of the CD. The center of the ring is coaxial with the center of the first centering hole. A radius of an outer periphery of each of the projection rings is smaller than a second radius of a second centering hole of a video disc.

4 Claims, 3 Drawing Sheets

OPTICAL DISC

BACKGROUND OF THE INVENTION

The present invention relates to an optical disc on which information is recorded, and more particularly to an optical disc provided with annular stack rings on both surfaces thereof for preventing the disc from adhering to another disc when put on the other disc during the production thereof.

A CD which is one of these optical discs, has an information recording surface formed on one side of a substrate made of a transparent resin. Digital signals are recorded in the form of fine depressions called pits on the recording surface. The recording surface is covered with a reflecting film by such method as the aluminum evaporation, and further with a protecting layer made of hard resin formed on the reflecting layer. A laser beam is radiated from the other side (reading surface) of the substrate so that the signals are optically reproduced. In addition, a label regarding the recorded information is printed on the protection layer.

During the manufacturing the CD by the procedure described above, after such steps as evaporation and printing, it is necessary to dry the formed or the printed surface of each disc before proceeding to the next step. In order that the space for manufacturing the CD is efficiently utilized particularly when producing a large number of discs, the discs are preferably piled up to be dried. However, if the discs are not sufficiently dried when the discs are piled one on another, surfaces of the adjacent discs may stick together. Hence the efficiency of the operations thereafter is reduced.

Referring to FIG. 5, in order to prevent the sticking of the surfaces, there is provided annular projections called stack rings 42 formed on both surfaces of a CD 4. The standard radial position of the stack ring 42 is set at a position between 16.5 mm and 22 mm from a center O of the CD in radius, and the standard height of the stack ring is 0.4 mm from the disc surface at maximum. Actual design of the stack ring such as the width and the position in the radial direction of the CD is arbitrarily determined by the manufacturer provided they are within the standard. When the stack rings are provided, each CD touches the adjacent CD not by the entire surface thereof, but only by the ring. Thus the sticking of the CDs can be prevented.

There is known a multifunctional disc player capable of additionally playing a disc besides the CD such as a video disc. The video disc has a diameter different from that of the CD. In addition, the centering hole of the video disc which engages a centering hub of the disc player for positioning the disc is different from that of the CD in diameter.

FIG. 4 shows a centering mechanism of such a multifunctional disc player for accurately positioning the rotational center O of the disc at an axis X of a spindle motor of the player. The structure of the mechanism is symmetrical with respect to the axis X so that only one side is shown in the figure.

Referring to FIG. 4, the centering mechanism comprises a centering hub 3 and a turntable 2 both of which are securely mounted on a shaft 1 of a spindle motor. The centering hub 3 has a center portion 3a which engages with a centering hole of a small diameter disc, namely the CD 4, and an outer portion 3b which engages with a centering hole of a large diameter disc, namely the video disc 200 (FIG. 3). The upper outer periphery of the center portion 3a is cut away to form a conical periphery 31 and the upper outer periphery of the outer portion 3b is also cut away to form a conical periphery 32. A spring 5 is provided between the turntable 2 and the centering hub 3, thereby urging the centering hub 3 upward.

An optical pickup (not shown) for reading out information from the disc is generally provided on the same side of the disc as the turntable 2.

As shown in FIG. 4, when the CD 4 is mounted in the disc player, the peripheral wall of a centering hole 41 thereof engages with the center portion 3a of the centering hub 3. Due to the urging of the spring 5, no gap is formed between the CD 4 and the conical periphery 31 of the hub so that the CD 4 is accurately positioned. At the same time, the CD 4 is urged downward by a damper (not shown) against the turntable 2.

Referring to FIG. 3, when the video disc 200 is mounted, the conical periphery 32 of the outer portion 3b engages with the inside wall of a centering hole 201 of the video disc 200 without forming a gap between the disc 200 and the conical periphery 32 by the spring 5. The video disc 200 is also urged by the damper against the turntable 2.

The standard clamping area of a regular disc player for exclusively playing the CDs is set at a position within a range of 13 mm to 16.5 mm from the center in radius, that is, 26 mm to 33 mm in diameter. However, since the centering hole of the video disc has a radius of 17.5 mm, the clamping area falls within the centering hole of the video disc, rendering it impossible for the turntable to hold the video disc. The turntable for the multifunctional disc player must be determined so as to be positioned on the outer side than in the regular disc player.

On the other hand, the information recording area of the CD starts at a position 23 mm from the center in radius, that is 46 mm in diameter. If the size of the turntable is increased, it will block the inner portion of the recording area, thereby preventing the reproduction of the information. Hence the width of the holding surface of the turntable is inevitably limited to fall within a range between positions 17.5 mm and 23 mm from the center in radius. As a result, the turntable must hold the CD at the stack ring, which is formed in a range between positions 16.5 mm and 22 mm from the center, as shown in FIG. 5.

As a result, the clamping height, which is the distance from the holding surface of the turntable 2 to the recording surface of the disc, varies from disc to disc due to unevenness of the height or the width of the stack ring 42. Moreover, since the disc is raised from the turntable a distance corresponding to the height of the stack ring, the disc cannot be sufficiently clamped, thereby increasing the amplitude of the fluctuation of the disc. As a consequence, disturbances which are not anticipated by the set standard occur. Thus a servo system must be designed so as to be able to restrain these disturbances, thereby increasing the dimension of the circuit and hence the manufacturing cost.

SUMMARY OF THE INVENTION

An object of the present invention is to provide an optical disc having a stack ring, which can be stably mounted on a turntable of a multifunctional disc player so that the servo system can be accurately operated.

According to the present invention, there is provided an optical disc comprising a first disc, the first disc having a first centering hole having a first radius, an inside wall of the first centering hole being to be engaged with a centering hub of a multifunctional disc player, and having annular projection rings on both sides of the first disc, a center of the ring being coaxial with a center of the first centering hole.

A radius of an outer periphery of each of the projection rings is smaller than a second radius of a second centering hole of a second disc which is a different type from the first disc, so that a turntable of the disc player is positioned outside the projection ring.

These and other objects and features of the present invention will become more apparent from the following detailed description with reference to the accompanying drawings.

DETAILED DESCRIPTION OF THE PREFERRED EMBODIMENT

Figure 1:
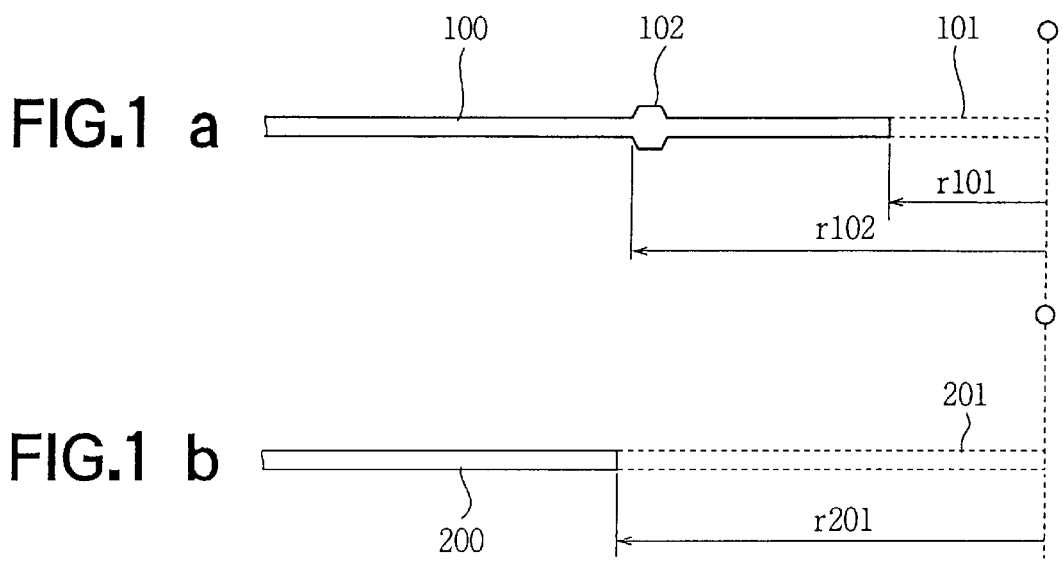
FIGS. 1a and 1b are schematic diagrams of a small diameter optical disc of the present invention and a conventional large diameter optical disc, respectively.

Referring to FIG. 1, a small diameter optical disc according to the present invention, such as a CD 100, has a centering hole 101 having a radius r101 and stack rings 102. The stack ring 102 is positioned so that a distance r102 from the center O of the disc to the outer periphery of the stack ring is smaller than a radius r201 of a centering hole 201 of the conventional large diameter optical disc such as the video disc 200 shown in FIG. 1b. The radius r201 of the video disc is, for example, 17.5 mm. Namely, when the discs 100 and 200 are positioned so that the rotational center of the CD 100 coincides with that of the video disc 200, the stack ring 102 is positioned inside the centering hole 201 of the video disc 200.

Figure 2:
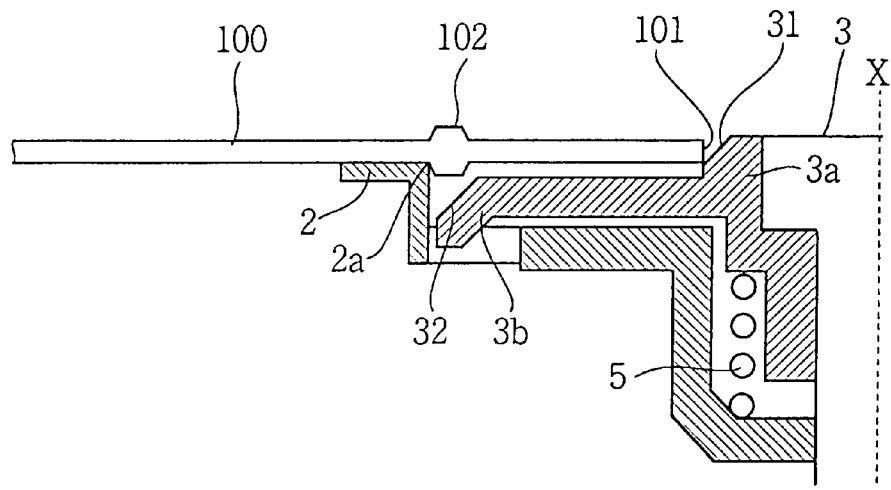
FIG. 2 is a sectional view showing a part of a disc player and the optical disc of FIG. 1a mounted on the disc player.
Figure 3:
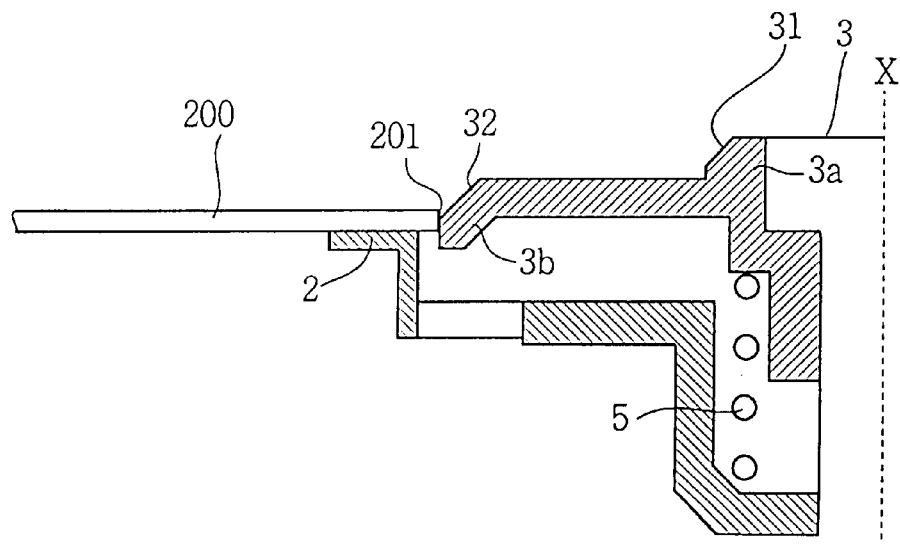
FIG. 3 is a sectional view showing a part of the disc player and the optical disc of FIG. 1b mounted on the disc player.
Figure 4:
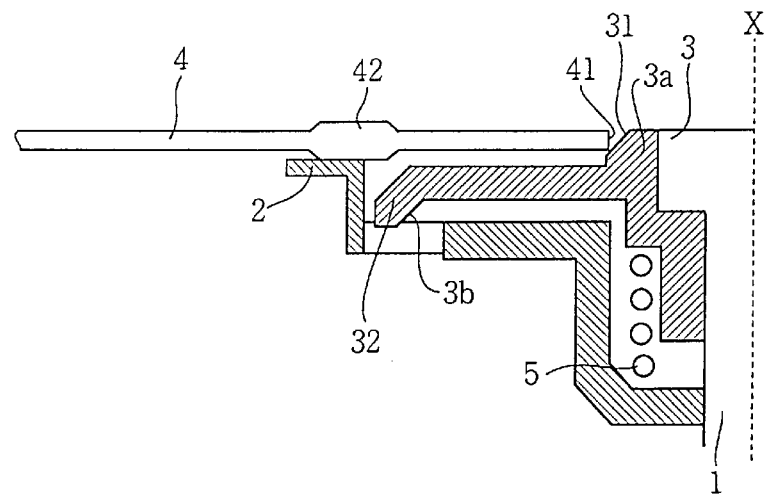
FIG. 4 is a sectional view showing a part of the disc player and a conventional small diameter optical disc mounted on the disc player.
Figure 5:
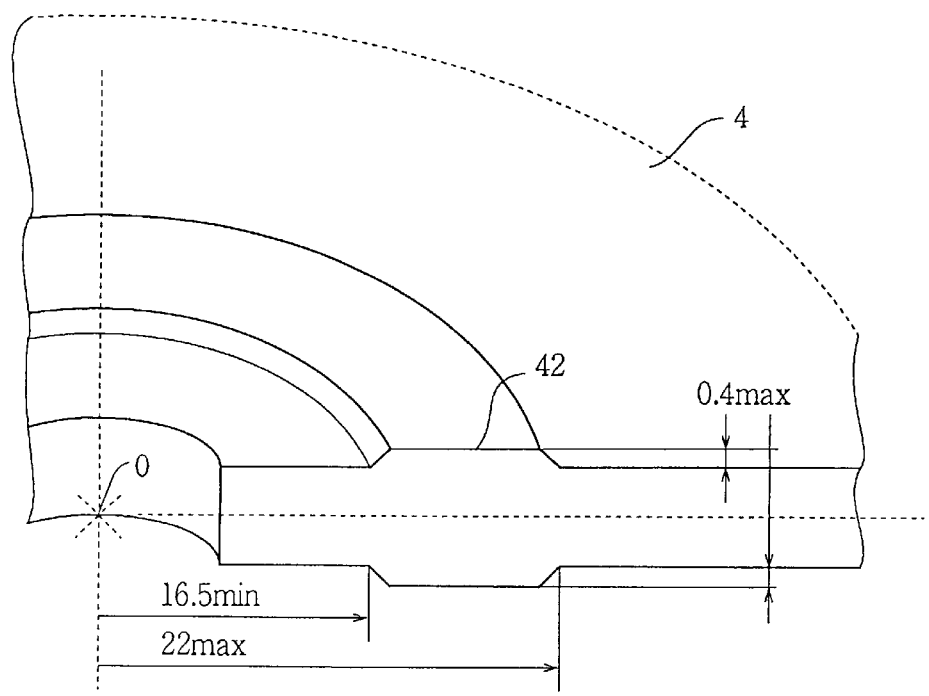
FIG. 5 is an illustration showing a part of the conventional small diameter optical disc.

Referring to FIG. 2, when the CD 100 is mounted on the conventional disc player described hereinbefore with reference to FIG. 4, the centering hole 101 engages with the center portion 3a of the centering hub 3. The centering hub 3 is raised by the urging of the spring 5 so that the inner periphery of the CD abuts against the conical periphery 31 without forming any gap therebetween. Hence the CD 100 is positioned. The CD 100 is further urged by a clamper (not shown) to be pressed against the turntable 2. Since the turntable 2 of the disc player is adapted to support the video disc 200 at the portion outside the center hole 201 thereof as shown in FIG. 3, the turntable 2 supports the CD 100 at the portion outside the stack ring 102.

More particularly, even though an inner edge 2a of the turntable 2 is positioned on the edge of the centering hole 201 of the video disc 200 (FIG. 3), that is, on a circle having the radius r201, for example 17.5 mm, the stack ring 102 having an outer periphery radius smaller than 17.5 mm is positioned on the inner side of the inner edge 2a. Thus the turntable 2 holds the CD at a portion other than the stack ring 102 and inside the information recording area (23 mm). Hence in the present invention, the clamping height depends mainly on the thickness of the protection layer of the CD so that the change in the clamping height is restrained. Moreover, the entire surface of the turntable 2 always supports the CD so that a clamping force as designed is exerted on the disc, thereby restraining the fluctuation within a predetermined range.

From the foregoing it will be understood that the present invention provides a small diameter optical disc, such as a CD, having a stack ring, wherein the stack ring is positioned inside a peripheral edge of a centering hole of a large diameter disc, such as a video disc. Hence when loaded in a multifunctional disc player capable of playing both the CDs and video discs, the stack ring does not interfere with the appropriate clamping of the CD. The servo system of the disc player is hence stably operated.

While the invention has been described in conjunction with preferred specific embodiment thereof, it will be understood that this description is intended to illustrate and not limit the scope of the invention, which is defined by the following claims.

What is claimed is:

1. Optical discs comprised of a first disc and a second disc used on a multifunctional disc player capable of using the first and second discs of different types, said disc player having a turntable including a centering hub formed within a recess of the turntable and movable relative thereto, for supporting the first and second discs, the centering hub including a center portion, an outer portion, and a conical periphery formed on a periphery of the outer portion, said first disc comprising:

a first centering hole having a first radius, an inside wall of the first centering hole adapted to be engaged with a side of the center portion of the centering hub of the multifunctional disc player, and annular projection rings integrally formed on both sides of the first disc, the annular projection rings formed of the same material as the first disc, a center of the annular projection rings being coaxial with a center of the first centering hole, wherein a radius of an outer periphery of each of the annular projection rings is smaller than a second radius of a second centering hole of the second disc, the second centering hole adapted to be engaged with periphery of the outer portion of the centering hub wherein the annular projection rings are positioned to be located inside the turntable of the disc player, and to be located at a position to correspond to an annular recess formed by the conical periphery of the outer portion such that the annular projections rings are seated within the recess formed in the turntable and the turntable contacts a flat disc surface of the first optical disc at a radius greater than the outer periphery of the annular projection rings.

2. The optical discs according to claim 1 wherein the first disc is a compact disc and the second disc is a video disc.

3. The optical discs according to claim 1, wherein one annular projection ring projects into the annular recess.

4. The optical disc according to claim 1, wherein the outer periphery of the annular projection rings is positioned on an inner side of an inner edge of the turntable.

* * * * *